Sept. 7, 1926.
J. E. C. BUTTERFIELD
1,598,600
CALCULATING APPARATUS
Filed Dec. 24, 1924
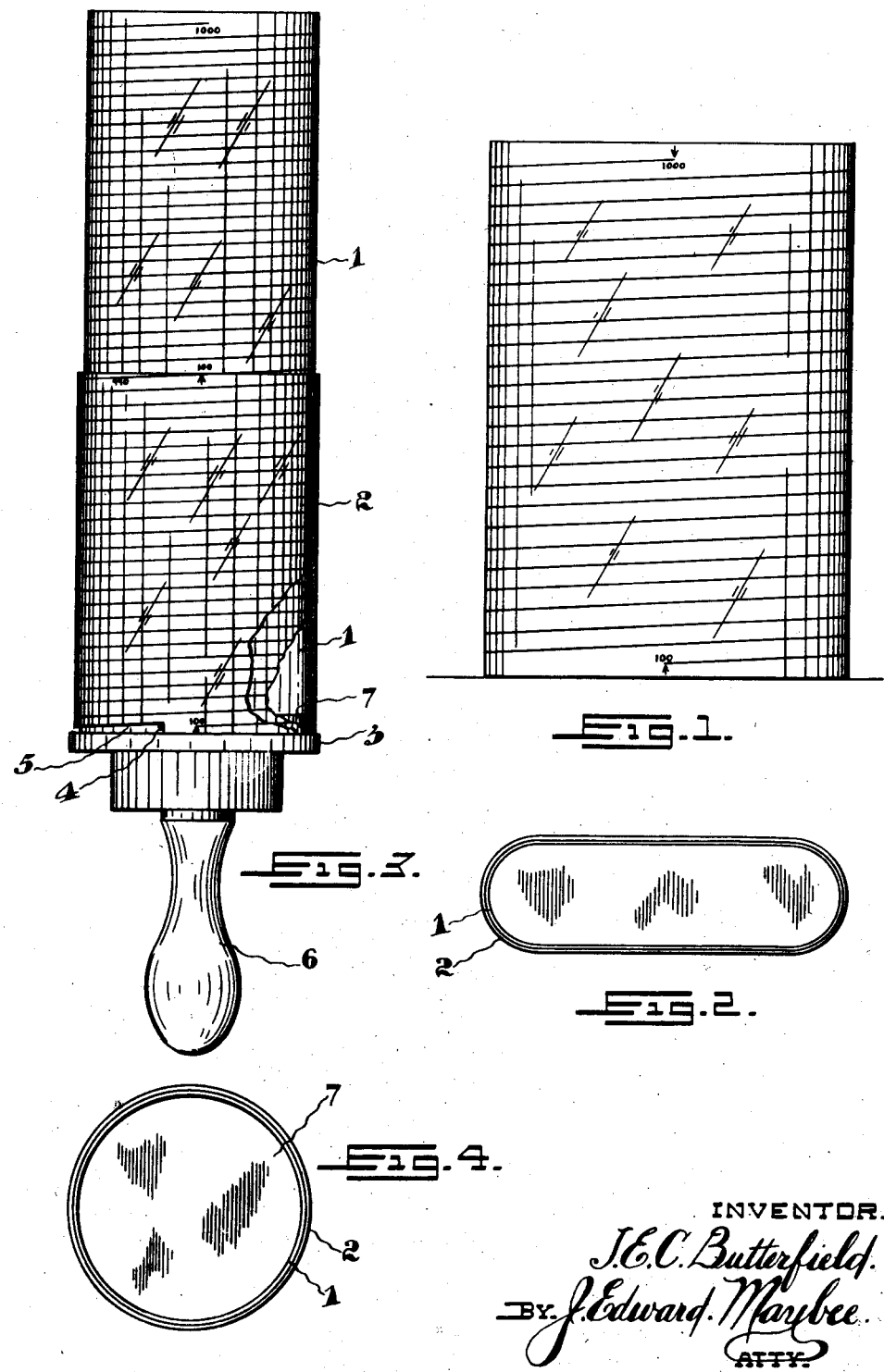
INVENTOR.
J.E.C. Butterfield.
BY J. Edward Maybee
ATTY.

Patented Sept. 7, 1926.

1,598,600

UNITED STATES PATENT OFFICE.

JOHN E. C. BUTTERFIELD, OF TORONTO, ONTARIO, CANADA.

CALCULATING APPARATUS.

Application filed December 24, 1924. Serial No. 757,937.

This invention relates to apparatus provided with suitable scales from which may be ascertained the answers to problems in multiplication, division, roots, powers, trigonometrical values or the like, or from which may be ascertained any other desired information relative to numbers according to the character of the scale or scales employed. The apparatus for this purpose heretofore known has been of a type in which the scope of use has been very limited, or of such a size as to be cumbersome in use, and further that several settings were required to obtain the desired result.

The object of the present invention is to devise apparatus which, for its size, will have a very much greater range of use than the previously known apparatus, in which the number of settings will be reduced to a minimum, thus reducing the possibility of error, and which is so constructed that the same device may be used for ascertaining various kinds of information.

I obtain my object by constructing the apparatus as hereinafter described and illustrated in the accompanying drawings in which—

Fig. 1 is a side elevation of the pocket form of my apparatus;

Fig. 2 a plan view of the same.

Fig. 3 a side elevation, partly broken away, of the office form of the apparatus; and Fig. 4 a plan view of the same.

In the drawings like numerals of reference indicate corresponding parts in the different figures.

My improvised device comprises two main members, the stationary member 1 and the movable member or cursor 2, which is adapted to be moved both circumferentially and longitudinally of the stationary member.

The member 1 has on its outer surface a suitable scale, depending on the character of the information desired to be obtained, for instance, a number scale, which scale is arranged in a spiral about the member, preferably, although not necessarily, commencing at the bottom. Preferably, however, the member 1 is hollow and made of transparent material so that a second scale giving other information may be arranged on its inner surface, while the interior of the member is adapted for receiving articles of various kinds. To avoid confusion between the two scales the figures of the inner scale may be of a different color to those on the outer scale or may be fainter so that they are only seen when the device is held towards the light.

The movable member or cursor 2 is also made of transparent material and has on either its outer or inner surface two setting marks, as for example, arrows, which marks are a distance apart equal to the distance between the beginning and end of the scale on the member 1. In some cases a scale or scales may be used on the outer or inner surface or both surfaces of the movable member, and the term "setting mark" in the specification and claim is intended to include any part of such a scale or scales which may be used in co-operation with the scale or scales on the stationary member.

The members 1 and 2 may be of right cylindrical form such as shown in Figs. 3 and 4, but as the movable member or cursor will usually be made of flexible material, the true cylindrical form is slightly departed from so that the distance from side to side in one direction is greater than the distance from side to side in a direction at right angles thereto. From this arrangement it follows that the frictional engagement of the movable member or cursor with the stationary member is increased at certain points, and therefore the possibility of the cursor accidentally moving relative to the stationary member is decreased.

In Figs. 1 and 2 the apparatus is shown as flat sided with rounded ends so as to better fit the pocket, although it may be of oval, elliptical, oblique cylindrical or other form in cross section in which the width in one direction is greater than the width in a direction at right angles thereto. With this form the movable member must necessarily be of flexible material, and the necessary frictional engagement between the movable and stationary member will be provided.

Assuming now the device is to be used for ascertaining results in multiplication, for example 1.21×9.5, the upper arrow is first set at the 121, and a pencil mark is then made over the lower "1" on the scale. The movable member is then moved until the pencil mark is over 95, and the lower arrow will then be over the 11.495, while the upper arrow will be off the scale. The placing of the decimal point has to be determined by judgment, the product being obviously 11.495.

Assuming, for example, it is desired to multiply 1.21×2.14, the upper arrow is set at 121 and a mark is made over the lower "1" on the scale. The movable member is then moved until the mark is over 214 and the upper arrow will be over the product, while the lower arrow will be off the scale. The procedure with this type of apparatus is always the same and the product is under whichever arrow is over any part of the scale.

In Figs. 3 and 4, I show the type of scale as used in offices and other places where compactness is not an important consideration. In this type the stationary member is substantially twice the length of the movable member and is provided with two similar scales, the one being arranged as a repeat of the other. The member 1 is preferably provided at its lower end with a circumferential shoulder 3 to limit the movement of the member 2 in the downward direction. This shoulder may be formed on a base or plug 7 on which the stationary member is mounted. The member 1 adjacent its bottom is provided with a short pin or projection 4, which pin is adapted to be received, when the lower setting mark is over the commencement point of the lower scale, in a notch 5 formed in the lower edge of the member 2 when the movable member is set at the starting or zero point. This notch is provided with an inclined side, the incline being exactly the same as that of the scale so that the positioning of the setting mark over any number near the commencement of the scale will not be interfered with.

This type of scale is used as follows. The movable member is set at the zero point with the pin 4 engaging in the notch 5 and with its lower setting mark over the numeral 1 of the lower scale. A pencil mark is then made over the first number and the movable member is moved until the lower setting mark is over the other number, at which time the pencil mark will appear over the product. With this arrangement the product may be indicated on one scale or on the other depending on the position of the numbers on the scale used for setting.

With either construction the process will be the exact reverse if the result of an operation in division is desired to be ascertained.

In the pocket type of the apparatus, the stationary or inner member may also be made of flexible material so that it may take up less room when in the pocket, but in most cases it will be most satisfactory to form it of stiff material.

In the office type, the stationary member may be provided with a suitable handle 6, preferably formed as part of the base or plug 7, to facilitate the handling of the same.

It will also be evident that in some cases the stationary member may be of such a length that two or more scales of different type may be arranged end to end, and the movable member may be moved along to co-operate with any desired one of said scales.

It will be evident, of course, that instead of or in addition to a scale suitable for working out the answers to questions in multiplication or division, a sine scale, a tangent scale, a logarithmic scale or the like may be used, or any combination of these, depending mainly on the requirements of the user, and suitable scale or indication combinations may, of course, be applied to the movable member or cursor as well as the stationary member.

From the above description it will be seen that I have devised calculating apparatus which will satisfactorily attain the objects of my invention, and that the principal feature of my invention is the forming of at least the outer member, and in some cases the inner member, also, of transparent material, and providing the outside of the outer member with a surface adapted to receive marks, which marks may be subsequently removed by an eraser or by washing with a damp cloth.

What I claim is:

In calculating apparatus, the combination of a pair of members sleeved on and movable circumferentially and longitudinally relative to one another, the under of said members being of stiff material and of greater diameter in one direction than in a direction at right angles thereto and provided with a scale, the outer of said members being formed of flexible transparent material and provided with a setting mark adapted to co-operate with the scale.

Signed at Toronto, Canada.

JOHN E. C. BUTTERFIELD.